Jan. 12, 1932.    C. BREER    1,840,656
VIBRATION DAMPENER
Filed June 25, 1927
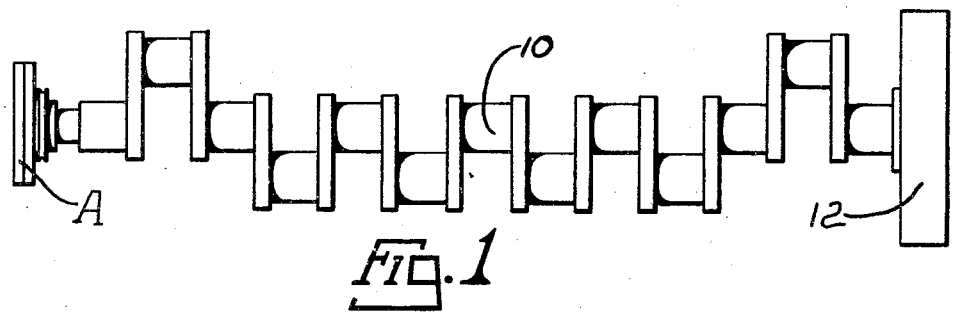
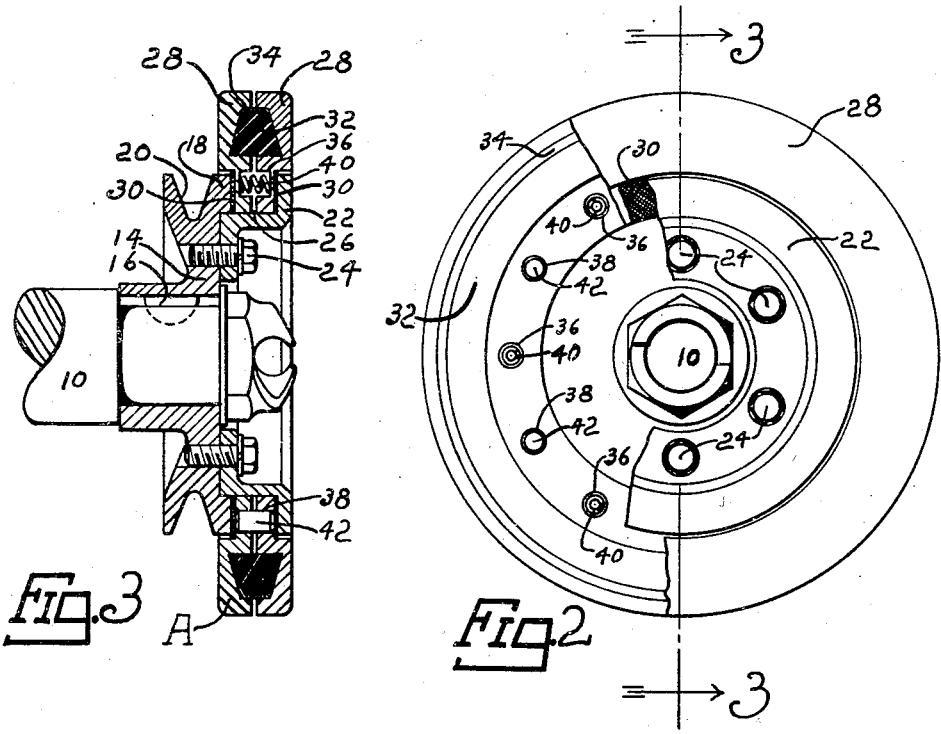
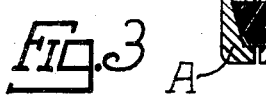
INVENTOR
CARL BREER.
BY
ATTORNEY Patented Jan. 12, 1932

1,840,656

UNITED STATES PATENT OFFICE

CARL BREER, OF DETROIT, MICHIGAN, ASSIGNOR TO CHRYSLER CORPORATION, OF HIGHLAND PARK, MICHIGAN, A CORPORATION OF DELAWARE

VIBRATION DAMPENER

Application filed June 25, 1927. Serial No. 201,545.

This invention relates to a vibration dampener and more particularly a vibration dampener for use on a crankshaft of an internal combustion engine for eliminating certain torsional vibration thereof.

An important object of the invention is to provide a dampener in which a slipping inertia ring is frictionally engaged and rotated by the crankshaft and the amount of frictional grip is varied in proportion to the speed of the crankshaft.

Another object of the invention is to provide a continuous ring, adapted for expansion by its centrifugal force, to urge an inertia member into frictional engagement with a rotating member on the crankshaft.

A further object is to provide a vibration dampening device of simple construction which is cheap and durable and one which operates to dampen all periods of vibration.

Other objects and advantages will more fully appear from the following description taken in connection with the accompanying drawings in which:

Fig. 1 is a side elevation of a crankshaft and flywheel embodying my invention.

Fig. 2 is an end view of the dampener, parts being broken away.

Fig. 3 is a sectional view taken on line 3—3 of Fig. 2.

Referring to an illustrated embodiment of my invention, a crankshaft 10 has been shown provided with a flywheel 12 at one end thereof and a dampener A at the other end thereof.

The dampener A comprises a hub member 14 secured to the crankshaft 10, as by the key 16, and adapted to rotate therewith. The hub 14 is provided with a radial integral plate portion or flange 18 which may be grooved as at 20 to form a fan belt pulley. Another radial plate 22 is secured to the hub 14 by bolts 24 forming an annular groove 26. A pair of inertia rings 28 are mounted in the annular groove 26 and rings 30, of friction material, are arranged between the opposite faces of the plates 18 and 22 and the rings 28.

A means has been provided between the inertia members 28 adapted to urge them against the friction rings 30 and in order to overcome a wide range of crankshaft torsional vibration it is necessary to carry a low pressure between the inertia members at extremely low speeds, such as to permit them to freely slip with respect to the crankshaft and to increase that pressure in proportion to the increased speed of rotation of the crankshaft so that the rings 28 are more firmly held against the rotating faces.

The method illustrated for varying the pressure of the rings against the frictional surfaces is to insert between the two rings 28 a continuous ring 32. This ring, in cross section, is triangular with its two sides tapered and so arranged as to produce a wedging action between the two rings 28 when it expands radially.

The ring is preferably made of a homogeneous composition of rubber and a metal. The rubber content permits the ring to expand and the metal gives it weight to increase the centrifugal force of the rotating ring. Rubber has a specific gravity of 1.2. While it is elastic to permit radial expansion it is not heavy enough. Lead oxide, for example, has a specific gravity of 9.4 and when added to the rubber, a homogenous composition is formed which is heavy and yet elastic. It has been found that a composition of equal parts lead and rubber forms a desirable ring having a specific gravity of about 5. It is to be understood that other metals may be used in place of lead, such as iron, copper, brass, nickel, tin, zinc et cetera but cost, weight and corrosion are to be considered, and lead oxide has been found to be the most satisfactory.

The outer periphery of the ring 32 is provided with a metallic ring 34 which protects the ring at the point between the inertia members, where it might otherwise be exposed to lubricant or dirt.

The rings are provided with alternate aligned recesses 36 and aligned openings 38. Springs 40 are received in the recesses 36 to initially urge the rings apart against the friction faces and pins 42 prevent independent rotation of the rings with respect to each other.

In the operation of my device, the crankshaft when rotating slowly, carries with it the inertia rings 28 and the composition rings 32; the rings being permitted to readily slip with respect to the crankshaft, dampening out the vibrations occuring at that speed.

What I claim is:

1. A vibration dampener comprising in combination a rotatable member, an inertia member rotatable relatively thereto adapted for frictional engagement with said rotatable member, a member adjacent said inertia member and a continuous expansible ring having lateral surfaces between said inertia member and the member adjacent thereto adapted to urge said inertia member into frictional engagement with said rotatable member by the expansion of said ring, the ring being adapted to vary the amount of frictional engagement in a proportion to the speed of rotation of said rotatable member.

2. A vibration dampener comprising in combination a rotatable member, spaced inertia members rotatable relatively thereto and adapted for frictional engagement with said rotatable member, and a continuous expansible ring between said inertia members adapted to separate said inertia members by the expansion of said ring to vary the amount of frictional engagement between said inertia members and said rotatable member.

3. A vibration dampener comprising in combination a rotatable member having a pair of separated plates, spaced inertia members between said plates rotatable relatively thereto and adapted for frictional engagement therewith, and a continuous inertia ring between said inertia members adapted for expansion by centrifugal force and having surfaces in contact with each of said inertia members, and means for preventing radial expansion of the outer surface of said ring whereby said ring is expanded to move said inertia members axially for varying the amount of frictional engagement between said inertia members and said separated plates proportionate to its speed of rotation.

4. A vibration dampener comprising in combination a rotatable member having a pair of radial plates, a two part inertia member having faces adapted for frictional engagement with said radial plates, and a ring composed of rubber and a metal arranged between said inertia member parts, said ring having tapered surfaces in contact with said inertia member parts.

5. A vibration dampener comprising in combination a rotatable member having a pair of spaced radial plates, spaced inertia members between said plates for frictional engagement therewith to form a driving connection between said members, and a continuous expansible ring having tapered sides between and in engagement with said inertia members to produce a wedging action due to centrifugal force when the members are rotated.

6. An article of manufacture which consists of an annular expansible ring having a homogeneous composition of rubber and a metal, and an annular metallic band around the outer periphery of said ring to prevent radial expansion by the action of centrifugal force, said ring being free for lateral expansion.

7. A vibration dampener comprising in combination, a rotatable member, an inertia member relatively rotatable therewith, a member adjacent said inertia member, an expansible inertia ring composed of rubber and a metal arranged between said inertia member and said member adjacent thereto to urge said inertia member into frictional engagement with said rotatable member by the expansion of said ring, and a metallic band around the outer periphery of said ring to prevent radial expansion of said ring by the action of centrifugal force, said ring being free for lateral expansion.

8. A vibration dampener comprising in combination, a rotatable member, an inertia member relatively rotatable therewith, a member adjacent to said inertia member, an expansible inertia ring arranged between said inertia member and the member adjacent thereto to urge said inertia member into frictional engagement with said rotatable member by the expansion of said ring, and means around the outer periphery of said ring to prevent radial expansion of said ring by the action of centrifugal force, said ring being free for lateral expansion.

CARL BREER.